(12) United States Patent
Altonen et al.

(10) Patent No.: US 9,289,933 B2
(45) Date of Patent: Mar. 22, 2016

(54) ALTERNATIVE PRESSURE CONTROL FOR AN INJECTION MOLDING APPARATUS

(71) Applicant: iMFLUX Inc., Cincinnati, OH (US)

(72) Inventors: Gene Michael Altonen, West Chester, OH (US); Ralph Edwin Neufarth, Liberty Township, OH (US); Gary Francis Schiller, Asheboro, NC (US); Charles John Berg, Jr., Wyoming, OH (US)

(73) Assignee: iMFLUX Inc., Hamilton, OH (US)

( * ) Notice: Subject to any disclaimer, the term of this patent is extended or adjusted under 35 U.S.C. 154(b) by 0 days.

(21) Appl. No.: 14/281,009

(22) Filed: May 19, 2014

(65) Prior Publication Data

US 2014/0255530 A1 Sep. 11, 2014

Related U.S. Application Data

(62) Division of application No. 13/476,047, filed on May 21, 2012, now Pat. No. 8,757,999.

(60) Provisional application No. 61/488,547, filed on May 20, 2011.

(51) Int. Cl.
*B29C 45/77* (2006.01)
*B29C 45/07* (2006.01)
(Continued)

(52) U.S. Cl.
CPC ............... *B29C 45/77* (2013.01); *B29C 45/07* (2013.01); *B29C 45/2725* (2013.01); *B29C 45/2806* (2013.01); *Y10T 137/776* (2015.04); *Y10T 137/7837* (2015.04); *Y10T 137/87917* (2015.04)

(58) Field of Classification Search
CPC ............................ B29C 45/07; B29C 45/2806
USPC ................. 425/562, 563, 564, 159, 572
See application file for complete search history.

(56) References Cited

U.S. PATENT DOCUMENTS

| | | | | |
|---|---|---|---|---|
| 3,741,700 A | * | 6/1973 | Hutchinson et al. | 425/159 |
| 4,632,652 A | * | 12/1986 | Farrell | 425/137 |
| 5,219,512 A | * | 6/1993 | Tsutsumi | 264/328.8 |

(Continued)

FOREIGN PATENT DOCUMENTS

| | | |
|---|---|---|
| JP | 60127125 | 7/1985 |
| JP | 11262936 | 9/1999 |

(Continued)

OTHER PUBLICATIONS

Alcoa:"QC-10 The aluminum mold alloy that out-machines, out-cools, out-produces and outsmarts steel", brochure dated 2010, 12 pages, Alcoa Forgings and Extrusions, 1600 Harvard Avenue, Cleveland, Ohio 44105, www.alcoa.com.

(Continued)

*Primary Examiner* — Tim Heitbrink
(74) *Attorney, Agent, or Firm* — Charles R. Ware

(57) ABSTRACT

A melt pressure regulating mechanism for an injection molding apparatus having a melt holder for pressurizing molten plastic prior to injection into a mold, the molten plastic having a melt pressure, and an injection element for advancing the molten plastic from the melt holder through a nozzle and into the mold, the melt pressure regulating mechanism comprising a pressure regulating device, comprising at least one of a fluid pressure regulating valve and a pressure relief valve.

9 Claims, 11 Drawing Sheets

(51) Int. Cl.
*B29C 45/28* (2006.01)
*B29C 45/27* (2006.01)

(56) References Cited

U.S. PATENT DOCUMENTS

| | | | |
|---|---|---|---|
| 5,246,660 A * | 9/1993 | Tsutsumi | 264/328.17 |
| 5,248,460 A * | 9/1993 | Tsutsumi | 264/40.5 |
| 5,350,288 A | 9/1994 | Kimoto | |
| 5,902,525 A | 5/1999 | Hettinga | |
| 5,935,505 A | 8/1999 | Whetten et al. | |
| 6,616,871 B1 | 9/2003 | Iimura et al. | |
| 6,767,486 B2 * | 7/2004 | Doughty et al. | 425/572 |
| 6,824,379 B2 | 11/2004 | Doyle et al. | |
| 7,785,090 B2 | 8/2010 | Amano et al. | |
| 7,910,029 B2 | 3/2011 | Koumaro | |
| 8,235,694 B2 | 8/2012 | Nam | |
| 2013/0295219 A1 | 11/2013 | Neufarth et al. | |
| 2013/0295220 A1 | 11/2013 | Neufarth et al. | |

FOREIGN PATENT DOCUMENTS

| | | |
|---|---|---|
| JP | 2000079439 | 3/2000 |
| JP | 2005215497 | 8/2005 |
| JP | 2008155506 | 7/2008 |

OTHER PUBLICATIONS

"Specialized Aluminum Products for Tool and Mold Applications", May/Jun. 2003 issue of Aluminum Now journal of The Aluminum Association, Inc., 4 pages.

AMPCO Metal, "Ampcoloy®944: A new copper—silicon—chromium alloy for the Moldmaking Industry", brochure, 2 pages, www.ampcometal.com.

AMPCO Metal, "Ampcoloy®944", brochure, 2 pages, www.ampcometal.com.

Clinton Aluminum & Stainless Steel, "Why aluminum mold?" presentation, Oct. 30, 2006, 20 pages, toll free # 800-826-3370.

European Tool & Mould Making ETMM, "High strength, hardness, thermal conductivity characterize copper mould making alloy", online article Dec. 9, 2011, 2 pages, http://www.etmm-online.com/materials/articles/353445/.

AMPCO Metal Inc., "Procurable Alloys", online article Nov. 2011, 5 pages, http://www.modernmetals.com/item/10715-procurable-alloys.html.

Sherry Baranek, "The Realities of Aluminum Tooling", article from Moldmaking Technology magazine dated Dec. 1, 2008, 4 pages, http://www.moldmakingtechnology.com/articles/the-realities-of-aluminum-tooling.

David Bank, "Choosing the Right Aluminum Alloy for Production Injection Molds", article from Moldmaking Technology magazine dated Jun. 1, 2007, 4 pages, http://www.moldmakingtechnology.com/articles/choosing-the-right-aluminum-alloy-for-production-injection-molds.

United States Patent and Trademark Office, online Trademark Electronic Search System, Moldmax HH, 2 pages, http://tess2.uspto.gov/bin/showfield?f=doc&state=4808:k8aqoi.3.8.

Rhoda Miel, "Aluminating Tooling", PlasticsNews.com online article Apr. 27, 2009, 2 pages, http://www.plasticsnews.com/article/20090427/NEWS/304279985/aluminating-tooling.

Joseph Pryweller, "Aluminum Injection Mold", online article from PlasticsNews.com, Jan. 13, 2003, 2 pages, http://aluminuminjectionmold.com/articles.html.

David Bank et al., "Why Plastic Flows Better in Aluminum Injection Molds", plastics technology article Sep. 2008, 8 pages.

Plastics Today, "Aluminum molds or steel? In the test, Al is the clear winner", online article Jan. 31, 2011, 2 pages, http://www.plasticstoday.com/articles/aluminum-molds-or-steel-test-aluminum-clear-winner.

A L Kelly, et al, "The effect of copper alloy mold tooling on the performance of the injection molding process", online article from The Free Library, 10 pages, http://www.thefreelibrary.com/The+effect+of+copper+alloy+mold+tooling+on+the+performance.

United States Patent and Trademark Office, online Trademark Electronic Search System, QC 10, 2 pages, http://tess2.uspto.gov/bin/showfield?f=doc&state=4810:7di60m.2.1.

Thyssenkrupp Materials NA, "QC-10 Aluminum Mold Plate", brochure, 4 pages.

Uddeholm, "Moldmax HH", brochure, 8 pages, www.uddeholm.com.

Li et al., Automatic Layout Design of Plastic Injection Mould Cooling System, Computer-aided Design 37 (2005) 645-662.

International Search Report, U.S. Appl. No. 13/682,456, dated Aug. 2, 2013, 11 pages.

12128 JP office action referencing Japanese Patent Application Publication No. Sho 33-000438, 3 pages.

* cited by examiner

US 9,289,933 B2

ALTERNATIVE PRESSURE CONTROL FOR AN INJECTION MOLDING APPARATUS

TECHNICAL FIELD

The present invention relates to apparatuses and methods for injection molding and, more particularly, to apparatuses and methods for controlling pressure for injection molding.

BACKGROUND

Injection molding is a technology commonly used for high-volume manufacturing of parts made of meltable material, most commonly of parts made of thermoplastic polymers. During a repetitive injection molding process, a plastic resin, most often in the form of small beads or pellets, is introduced to an injection molding machine that melts the resin beads under heat, pressure, and shear. The now molten resin is forcefully injected into a mold cavity having a particular cavity shape. The injected plastic is held under pressure in the mold cavity, cooled, and then removed as a solidified part having a shape that essentially duplicates the cavity shape of the mold. The mold itself may have a single cavity or multiple cavities. Each cavity may be connected to a flow channel by a gate, which directs the flow of the molten resin into the cavity. Thus, a typical injection molding procedure comprises four basic operations: (1) heating the plastic in the injection molding machine to allow it to flow under pressure; (2) injecting the melted plastic into a mold cavity or cavities defined between two mold halves that have been closed; (3) allowing the plastic to cool and harden in the cavity or cavities while under pressure; and (4) opening the mold halves to cause the part to be ejected from the mold.

The molten plastic resin is injected into the mold cavity and the plastic resin is forcibly pushed through the cavity by an injection element of the injection molding machine until the plastic resin reaches the location in the cavity furthest from the gate. The resulting length and wall thickness of the part is a result of the shape of the mold cavity.

While it may be desirous to reduce the wall thickness of injected molded parts to reduce the plastic content, and thus cost, of the final part; reducing wall thickness using a conventional injection molding process can be an expensive and a non-trivial task, particularly when designing for wall thicknesses less than 1.0 millimeter. As a liquid plastic resin is introduced into an injection mold in a conventional injection molding process, the material adjacent to the walls of the cavity immediately begins to "freeze," or solidify and cure. As the material flows through the mold, a boundary layer of material is formed against the sides of the mold. As the mold continues to fill, the boundary layer continues to thicken, eventually closing off the path of material flow and preventing additional material from flowing into the mold. The plastic resin freezing on the walls of the mold is exacerbated when the molds are cooled, a technique used to reduce the cycle time of each part and increase machine throughput.

There may also be a desire to design a part and the corresponding mold such that the liquid plastic resin flows from areas having the thickest wall thickness towards areas having the thinnest wall thickness. Increasing thickness in certain regions of the mold can ensure that sufficient material flows into areas where strength and thickness is needed. This "thick-to-thin" flow path requirement can make for inefficient use of plastic and result in higher part cost for injection molded part manufacturers because additional material must be molded into parts at locations where the material is unnecessary.

One method to decrease the wall thickness of a part is to increase the pressure of the liquid plastic resin as it is introduced into the mold. By increasing the pressure, the molding machine can continue to force liquid material into the mold before the flow path has closed off. Increasing the pressure, however, has both cost and performance downsides. As the pressure required to mold the component increases, the molding equipment must be strong enough to withstand the additional pressure, which generally equates to being more expensive. A manufacturer may have to purchase new equipment to accommodate these increased pressures. Thus, a decrease in the wall thickness of a given part can result in significant capital expenses to accomplish the manufacturing via conventional injection molding techniques.

Additionally, when the liquid plastic material flows into the injection mold and rapidly freezes, the polymer chains retain the high levels of stress that were present when the polymer was in liquid form. The frozen polymer molecules retain higher levels of flow induced orientation when molecular orientation is locked in the part, resulting in a frozen-in stressed state. These "molded-in" stresses can lead to parts that warp or sink following molding, have reduced mechanical properties, and have reduced resistance to chemical exposure. The reduced mechanical properties are particularly important to control and/or minimize for injection molded parts such as thinwall tubs, living hinge parts, and closures.

In an effort to avoid some of the drawbacks mentioned above, many conventional injection molding operations use shear-thinning plastic material to improve flow of the plastic material into the mold cavity. As the shear-thinning plastic material is injected into the mold cavity, shear forces generated between the plastic material and the mold cavity walls tend to reduce viscosity of the plastic material, thereby allowing the plastic material to flow more freely and easily into the mold cavity. As a result, it is possible to fill thinwall parts fast enough to avoid the material freezing off before the mold is completely filled.

Reduction in viscosity is directly related to the magnitude of shear forces generated between the plastic material and the feed system, and between the plastic material and the mold cavity wall. Thus, manufacturers of these shear-thinning materials and operators of injection molding systems have been driving injection molding pressures higher in an effort to increase shear, thus reducing viscosity. Typically, injection molding systems inject the plastic material in to the mold cavity at melt pressures of 15,000 psi or more. Manufacturers of shear-thinning plastic material teach injection molding operators to inject the plastic material into the mold cavities above a minimum melt pressure. For example, polypropylene resin is typically processed at pressures greater than 6,000 psi (the recommended range from the polypropylene resin manufacturers is typically from greater than 6,000 psi to about 15,000 psi. Resin manufacturers recommend not to exceed the top end of the range. Press manufacturers and processing engineers typically recommend processing shear thinning polymers at the top end of the range, or significantly higher, to achieve maximum potential shear thinning, which is typically greater than 15,000 psi, to extract maximum thinning and better flow properties from the plastic material. Shear thinning thermoplastic polymers generally are processed in the range of over 6,000 psi to about 30,000 psi.

The molds used in injection molding machines must be capable of withstanding these high melt pressures. Moreover, the material forming the mold must have a fatigue limit that can withstand the maximum cyclic stress for the total number of cycles a mold is expected to run over the course of its lifetime. As a result, mold manufacturers typically form the mold from materials having high hardness, typically greater than 30 Rc, and more typically greater than 50 Rc. These high hardness materials are durable and equipped to withstand the high clamping pressures required to keep mold components pressed against one another during the plastic injection process. These high hardness materials are also better able to resist wear from the repeated contact between molding surfaces and polymer flow.

High production injection molding machines (i.e., class 101 and class 102 molding machines) that produce thinwalled consumer products exclusively use molds having a majority of the mold made from the high hardness materials. High production injection molding machines typically produce 500,000 cycles per year or more. Industrial quality production molds must be designed to withstand at least 500,000 cycles per year, preferably more than 1,000,000 cycles per year, more preferably more than 5,000,000 cycles per year, and even more preferably more than 10,000,000 cycles per year. These machines have multi cavity molds and complex cooling systems to increase production rates. The high hardness materials are more capable of withstanding the repeated high pressure clamping operations than lower hardness materials. However, high hardness materials, such as most tool steels, have relatively low thermal conductivities, generally less than 20 BTU/HR FT ° F., which leads to long cooling times as heat is transferred through from the molten plastic material through the high hardness material.

In an effort to reduce cycle times, typical high production injection molding machines having molds made of high hardness materials include relatively complex internal cooling systems that circulate cooling fluid within the mold. These cooling systems accelerate cooling of the molded parts, thus allowing the machine to complete more cycles in a given amount of time, which increases production rates and thus the total amount of molded parts produced. In some class 101, more than 1 or 2 million cycles per year may be run, these molds are sometimes referred to as "ultra high productivity molds," or "class 401 molds."

Another drawback to using high hardness materials for the molds is that high hardness materials, such as tool steels, generally are fairly difficult to machine. As a result, known high throughput injection molds require extensive machining time and expensive machining equipment to form, and expensive and time consuming post-machining steps to relieve stresses and optimize material hardness.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments of the present invention generally relate to systems, machines, products, and methods of producing products by injection molding and more specifically to systems, products, and methods of producing products by low constant pressure injection molding.

The term "low pressure" as used herein with respect to melt pressure of a thermoplastic material, means melt pressures in a vicinity of a nozzle of an injection molding machine of approximately 6000 psi and lower.

The term "substantially constant pressure" as used herein with respect to a melt pressure of a thermoplastic material, means that deviations from a baseline melt pressure do not produce meaningful changes in physical properties of the thermoplastic material. For example, "substantially constant pressure" includes, but is not limited to, pressure variations for which viscosity of the melted thermoplastic material does not meaningfully change. The term "substantially constant" in this respect includes deviations of approximately 30% from a baseline melt pressure. For example, the term "a substantially constant pressure of approximately 4600 psi" includes pressure fluctuations within the range of about 6000 psi (30% above 4600 psi) to about 3200 psi (30% below 4600 psi). A melt pressure is considered substantially constant as long as the melt pressure fluctuates no more than 30% from the recited pressure.

Figure 1:
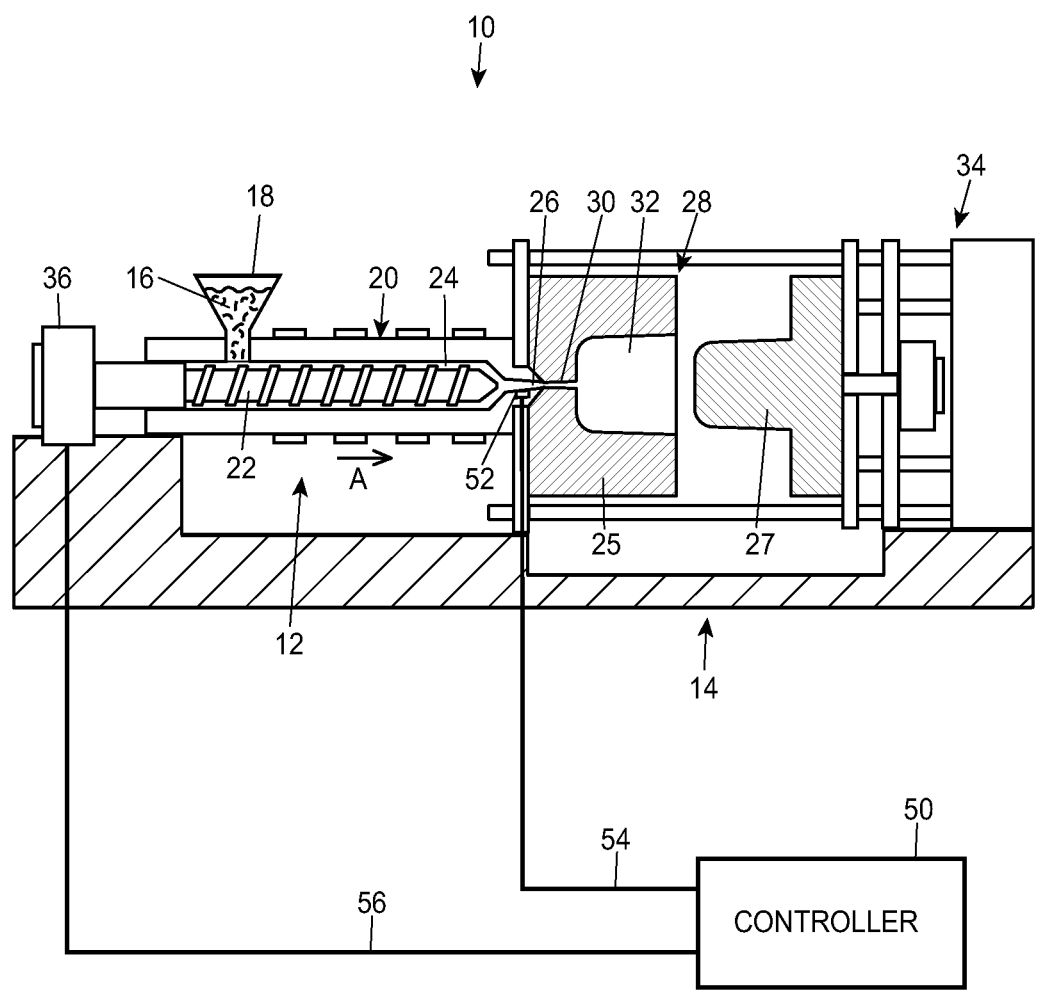
FIG. 1 illustrates a schematic view of an injection molding machine constructed according to the disclosure.

Referring to the figures in detail, FIG. 1 illustrates an exemplary low constant pressure injection molding apparatus 10 for producing thin-walled parts in high volumes (e.g., a class 101 or 102 injection mold, or an "ultra high productivity mold"). The injection molding apparatus 10 generally includes an injection system 12 and a clamping system 14. A thermoplastic material may be introduced to the injection system 12 in the form of thermoplastic pellets 16. The thermoplastic pellets 16 may be placed into a hopper 18, which feeds the thermoplastic pellets 16 into a heated barrel 20 of the injection system 12. The thermoplastic pellets 16, after being fed into the heated barrel 20, may be driven to the end of the heated barrel 20 by a reciprocating screw 22. The heating of the heated barrel 20 and the compression of the thermoplastic pellets 16 by the reciprocating screw 22 causes the thermoplastic pellets 16 to melt, forming a molten thermoplastic material 24. The molten thermoplastic material is typically processed at a temperature of about 130° C. to about 410° C.

The reciprocating screw 22 forces the molten thermoplastic material 24, toward a nozzle 26 to form a shot of thermoplastic material, which will be injected into a mold cavity 32 of a mold 28. The molten thermoplastic material 24 may be injected through a gate 30, which directs the flow of the molten thermoplastic material 24 to the mold cavity 32. The mold cavity 32 is formed between first and second mold parts 25, 27 of the mold 28 and the first and second mold parts 25, 27 are held together under pressure by a press or clamping unit 34. The press or clamping unit 34 applies a clamping force in the range of approximately 1000 psi to approximately 6000 psi during the molding process to hold the first and second mold parts 25, 27 together while the molten thermoplastic material 24 is injected into the mold cavity 32. To support these clamping forces, the clamping system 14 may include a mold frame and a mold base, the mold frame and the mold base being formed from a material having a surface hardness of more than about 165 BHN and preferably less than 260 BHN, although materials having surface hardness BHN values of greater than 260 may be used as long as the material is easily machineable, as discussed further below.

Once the shot of molten thermoplastic material 24 is injected into the mold cavity 32, the reciprocating screw 22 stops traveling forward. The molten thermoplastic material 24 takes the form of the mold cavity 32 and the molten thermoplastic material 24 cools inside the mold 28 until the thermoplastic material 24 solidifies. Once the thermoplastic material 24 has solidified, the press 34 releases the first and second mold parts 25, 27, the first and second mold parts 25, 27 are separated from one another, and the finished part may be ejected from the mold 28. The mold 28 may include a plurality of mold cavities 32 to increase overall production rates.

A controller 50 is communicatively connected with a sensor 52 and a screw control 36. The controller 50 may include a microprocessor, a memory, and one or more communication links. The controller 50 may be connected to the sensor 52 and the screw control 36 via wired connections 54, 56, respectively. In other embodiments, the controller 50 may be connected to the sensor 52 and screw control 56 via a wireless connection, a mechanical connection, a hydraulic connection, a pneumatic connection, or any other type of communication connection known to those having ordinary skill in the art that will allow the controller 50 to communicate with both the sensor 52 and the screw control 36.

In the embodiment of FIG. 1, the sensor 52 is a pressure sensor that measures (directly or indirectly) melt pressure of the molten thermoplastic material 24 in the nozzle 26. The sensor 52 generates an electrical signal that is transmitted to the controller 50. The controller 50 then commands the screw control 36 to advance the screw 22 at a rate that maintains a substantially constant melt pressure of the molten thermoplastic material 24 in the nozzle 26. While the sensor 52 may directly measure the melt pressure, the sensor 52 may measure other characteristics of the molten thermoplastic material 24, such as temperature, viscosity, flow rate, etc, that are indicative of melt pressure. Likewise, the sensor 52 need not be located directly in the nozzle 26, but rather the sensor 52 may be located at any location within the injection system 12 or mold 28 that is fluidly connected with the nozzle 26. If the sensor 52 is not located within the nozzle 26, appropriate correction factors may be applied to the measured characteristic to calculate the melt pressure in the nozzle 26. In yet other embodiments, the sensor 52 need not be fluidly connected with the nozzle. Rather, the sensor could measure clamping force generated by the clamping system 14 at a mold parting line between the first and second mold parts 25, 27.

Although an active, closed loop controller 50 is illustrated in FIG. 1, other pressure regulating devices may be used instead of the closed loop controller 50. For example, a pressure regulating valve (not shown) or a pressure relief valve (not shown) may replace the controller 50 to regulate the melt pressure of the molten thermoplastic material 24. More specifically, the pressure regulating valve and pressure relief valve can prevent overpressurization of the mold 28. Another alternative mechanism for preventing overpressurization of the mold 28 is to activate an alarm when an overpressurization condition is detected.

Figure 2:
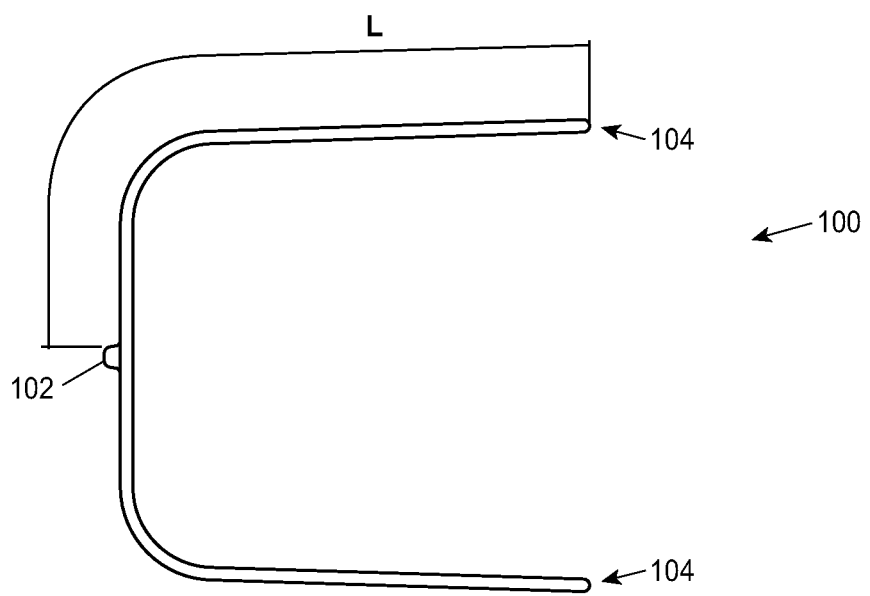
FIG. 2 illustrates one embodiment of a thin-walled part formed in the injection molding machine of FIG. 1.

Turning now to FIG. 2, an example molded part 100 is illustrated. The molded part 100 is a thin-walled part. Molded parts are generally considered to be thin-walled when a length of a flow channel L divided by a thickness of the flow channel T is greater than 100 (i.e., L/T>100). In some injection molding industries, thin-walled parts may be defined as parts having an L/T>200, or an L/T>250. The length of the flow channel L is measured from a gate 102 to a flow channel end 104. Thin-walled parts are especially prevalent in the consumer products industry.

Thin-walled parts present certain obstacles in injection molding. For example, the thinness of the flow channel tends to cool the molten thermoplastic material before the material reaches the flow channel end 104. When this happens, the thermoplastic material freezes off and no longer flows, which results in an incomplete part. To overcome this problem, traditional injection molding machines inject the molten thermoplastic material at very high pressures, typically greater than 15,000 psi, so that the molten thermoplastic material rapidly fills the mold cavity before having a chance to cool and freeze off. This is one reason that manufacturers of the thermoplastic materials teach injecting at very high pressures. Another reason traditional injection molding machines inject at high pressures is the increased shear, which increases flow characteristics, as discussed above. These very high injection pressures require the use of very hard materials to form the mold 28 and the feed system.

Traditional injection molding machines use tool steels or other hard materials to make the mold. While these tool steels are robust enough to withstand the very high injection pressures, tool steels are relatively poor thermal conductors. As a result, very complex cooling systems are machined into the molds to enhance cooling times when the mold cavity is filled, which reduces cycle times and increases productivity of the mold. However, these very complex cooling systems add great time and expense to the mold making process.

The inventors have discovered that shear-thinning thermoplastics (even minimally shear-thinning thermoplastics) may be injected into the mold 28 at low, substantially constant, pressure without any significant adverse affects. Examples of these materials include but are not limited to polymers and copolymers comprised of, polypropylene, polyethylene, thermoplastic elastomers, polyester, polystyrene, polycarbonate, poly(acrylonitrile-butadiene-styrene), poly(latic acid), polyhydroxyalkanoate, polyamides, polyacetals, ethylene-alpha olefin rubbers, and styrene-butadiene-stryene block copolymers. In fact, parts molded at low, substantially constant, pressures exhibit some superior properties as compared to the same part molded at a conventional high pressure. This discovery directly contradicts conventional wisdom within the industry that teaches higher injection pressures are better. Without being bound by theory, it is believed that injecting the molten thermoplastic material into the mold 28 at low, substantially constant, pressures creates a continuous flow front of thermoplastic material that advances through the mold from a gate to a farthest part of the mold cavity. By maintaining a low level of shear, the thermoplastic material remains liquid and flowable at much lower temperatures and pressures than is otherwise believed to be possible in conventional high pressure injection molding systems. Moreover, limiting pressure within a mold can protect fragile mold elements, such as seals, parting lines, and moving mold mechanisms. In some cases, a maximum pressure threshold for these fragile mold elements can be determined and the pressure control mechanism may be set so that melt pressure does not exceed this threshold.

Figure 3:
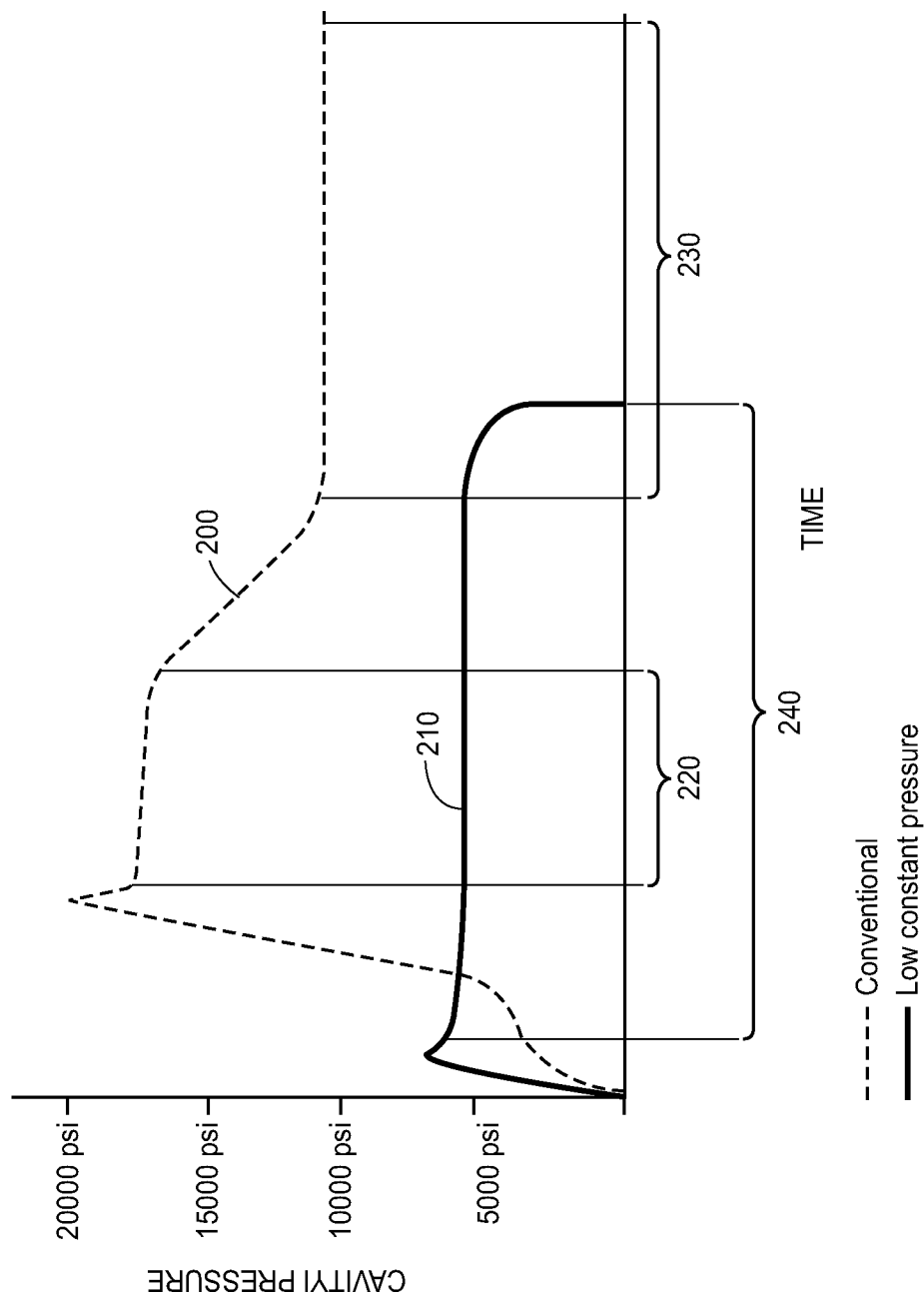
FIG. 3 is a cavity pressure vs. time graph for the injection molding machine of FIG. 1.

Turning now to FIG. 3, a typical pressure-time curve for a conventional high pressure injection molding process is illustrated by the dashed line 200. By contrast, a pressure-time curve for the disclosed low constant pressure injection molding machine is illustrated by the solid line 210.

In the conventional case, melt pressure is rapidly increased to well over 15,000 psi and then held at a relatively high pressure, more than 15,000 psi, for a first period of time 220. The first period of time 220 is the fill time in which molten plastic material flows into the mold cavity. Thereafter, the melt pressure is decreased and held at a lower, but still relatively high pressure, 10,000 psi or more, for a second period of time 230. The second period of time 230 is a packing time in which the melt pressure is maintained to ensure that all gaps in the mold cavity are back filled. The mold cavity in a conventional high pressure injection molding system is filled from the end of the flow channel back to towards the gate. As a result, plastic in various stages of solidification are packed upon one another, which may cause inconsistencies in the finished product, as discussed above. Moreover, the conventional packing of plastic in various stages of solidification results in some non-ideal material properties, for example, molded-in stresses, sink, non-optimal optical properties, etc.

The constant low pressure injection molding system, on the other hand, injects the molten plastic material into the mold cavity at a substantially low pressure for a single time period 240. The injection pressure is less than 6,000 psi. By using a substantially constant low pressure, the molten thermoplastic material maintains a continuous melt front that advances through the flow channel from the gate towards the end of the flow channel. Thus, the plastic material remains relatively uniform at any point along the flow channel, which results in a more uniform and consistent finished product. By filling the mold with a relatively uniform plastic material, the finished molded parts form crystalline structures that have better mechanical and optical properties than conventionally molded parts. Moreover, the skin layers of parts molded at low constant pressures exhibit different characteristics than skin layers of conventionally molded parts. As a result, the skin layers of parts molded under low constant pressure can have better optical properties than skin layers of conventionally molded parts.

By maintaining a substantially constant and low (e.g., less than 6000 psi) melt pressure within the nozzle, more machineable materials may be used to form the mold 28. For example, the mold 28 illustrated in FIG. 1 may be formed of a material having a milling machining index of greater than 100%, a drilling machining index of greater than 100%, a wire EDM machining index of greater than 100%, a graphite sinker EDM machining index of greater than 200%, or a copper sinker EDM machining index of greater than 150%. The machining indexes are based upon milling, drilling, wire EDM, and sinker EDM tests of various materials. The test methods for determining the machining indices are explained in more detail below. Examples of machining indexes for a sample of materials are compiled below in Table 1.

TABLE 1

| | | Machining Technology | | | | | | | | | |
|---|---|---|---|---|---|---|---|---|---|---|---|
| | | Milling | | Drilling | | | | Sinker EDM- | | | |
| | | Spindle | | Spindle | | Wire EDM | | Graphite | | Sinker EDM-Copper | |
| | | Load | Index % | Load | Index % | time | Index % | time | Index % | time | Index % |
| 1117 steel* | | 0.72 | 100% | 0.32 | 100% | 9:34 | 100% | 0:14:48 | 100% | 0:24:00 | 100% |
| 6061 Aluminum alloy | | 0.50 | 144% | 0.20 | 160% | 4:46 | 201% | 0:05:58 | 248% | 0:15:36 | 154% |
| 7075 Aluminum alloy | | 0.55 | 131% | 0.24 | 133% | 4:48 | 199% | 0:05:20 | 278% | 0:12:27 | 193% |
| QC-10 Aluminum alloy | a | 0.56 | 129% | 0.24 | 133% | 4:47 | 200% | 0:05:11 | 286% | 0:12:21 | 194% |
| 41-40 Steel | | 0.92 | 78% | 0.37 | 86% | 9:28 | 101% | 0:09:36 | 154% | 0:19:20 | 124% |
| 420 stainless steel | | 1.36 | 53% | 0.39 | 82% | 8:30 | 113% | 0:10:12 | 145% | 0:23:20 | 103% |
| A2 AISI tool steel | | 0.97 | 74% | 0.45 | 71% | 8:52 | 108% | 0:08:00 | 185% | 0:20:12 | 119% |
| S7 AISI tool steel | | 1.20 | 60% | 0.43 | 74% | 9:03 | 106% | 0:12:53 | 115% | 0:20:58 | 114% |
| P20 AISI mold steel | | 1.10 | 65% | 0.38 | 84% | 9:26 | 101% | 0:11:47 | 126% | 0:20:30 | 117% |
| PX5 AISI mold steel | | 1.12 | 64% | 0.37 | 86% | 9:22 | 102% | 0:12:37 | 117% | 0:23:18 | 103% |
| MOLDMAX HH Beryllium | b | 0.80 | 90% | 0.36 | 89% | 6:00 | 159% | 6:59:35 | 4% 1 | 0:43:38 | 55% 3 |

TABLE 1-continued

| | Machining Technology | | | | | | | | | |
|---|---|---|---|---|---|---|---|---|---|---|
| | Milling | | Drilling | | | | Sinker EDM- | | | |
| | Spindle | | Spindle | | Wire EDM | | Graphite | | Sinker EDM-Copper | |
| | Load | Index % | Load | Index % | time | Index % | time | Index % | time | Index % |
| copper mold alloy AMPCOLOY 944 steel alloy | c 0.62 | 116% | 0.32 | 100% | 6:53 | 139% | 3:13:41 | 8% 2 | 0:30:21 | 79% 4 | a—QC-10 available from Alcoa, Inc. of Pittsburgh, Pennsylvania, United States
b—MOLDMAX HH available from Brush Wellman, Inc. of Mayfield Heights, Ohio, United States
c—AMPCOLOY 944 available from Ampco Metal, SA of Marly, Switzerland
*1117 is the benchmark material for this test. Published data references 1212 carbon steel as the benchmark material. 1212 was not readily available. Of the published data, 1117 was the closest in composition and machining index percentage (91%).
1 Significant graphite electrode wear: ~20%
2 graphite electrode wear: ~15%
3 Cu electrode wear: ~15%
4 Cu electrode wear: ~3%

Using easily machineable materials to form the mold 28 results in greatly decreased manufacturing time and thus, a decrease in manufacturing costs. Moreover, these machineable materials generally have better thermal conductivity than tool steels, which increases cooling efficiency and decreases the need for complex cooling systems.

When forming the mold 28 of these easily machineable materials, it is also advantageous to select easily machineable materials having good thermal conductivity properties. Materials having thermal conductivities of more than 30 BTU/HR FT ° F. are particularly advantageous. For example easily machineable materials having good thermal conductivities include, but are not limited to, QC-10 (an aluminum alloy available from Alcoa, Inc. of Pittsburgh, Pa., United States), DURAMOLD-5 (an aluminum alloy available from Vista Metals Corp. of Fontana, Calif., United States), and HOKOTOL (an aluminum alloy available from Aleris International, Inc. of Beachwood, Ohio, United States). Materials with good thermal conductivity more efficiently transmit heat from the thermoplastic material out of the mold. As a result, more simple cooling systems may be used. Additionally, non-naturally balanced feed systems are also possible for use in the constant low pressure injection molding machines described herein.

Figure 4:
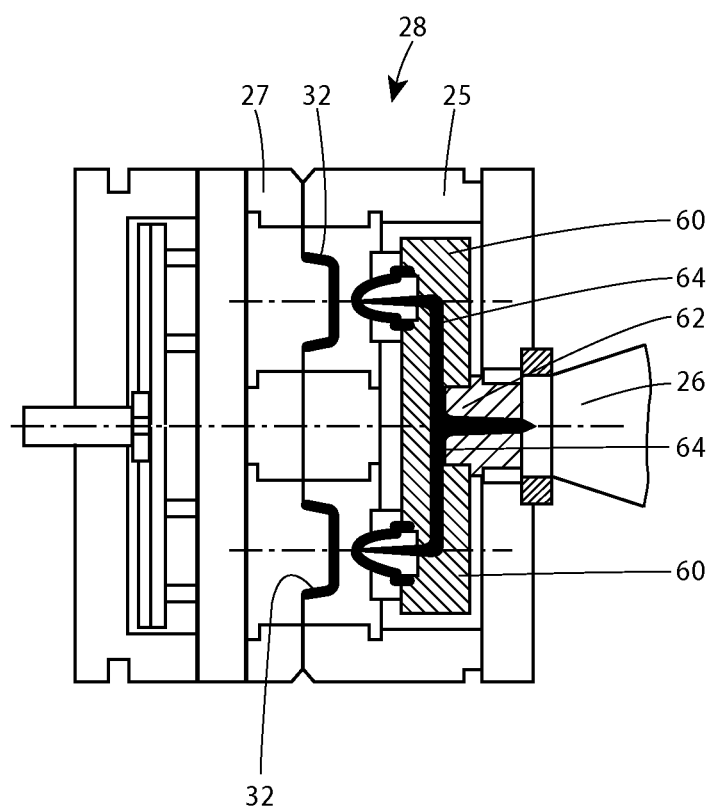
FIG. 4 is a cross-sectional view of one embodiment of a mold of the injection molding machine of FIG. 1.

One example of a multi-cavity mold 28 is illustrated in FIG. 4. Multi-cavity molds generally include a feed manifold 60 that directs molten thermoplastic material from the nozzle 26 to the individual mold cavities 32. The feed manifold 60 includes a sprue 62, which directs the molten thermoplastic material into one or more runners or feed channels 64. Each runner may feed multiple mold cavities 32. In many high capacity injection molding machines, the runners are heated to enhance flowability of the molten thermoplastic material. Because viscosity of the molten thermoplastic material is very sensitive to shear and pressure variations at high pressures (e.g., above 10,000 psi), conventional feed manifolds are naturally balanced to maintain uniform viscosity. Naturally balanced feed manifolds are manifolds in which molten thermoplastic material travels an equal distance from the sprue to any mold cavity. Moreover, the cross-sectional shapes of each flow channel are identical, the number and type of turns are identical, and the temperatures of each flow channel are identical. Naturally balanced feed manifolds allow the mold cavities to be filled simultaneously so that each molded part has identical processing conditions and material properties. Naturally balanced feed manifolds are expensive to manufacture and limit mold designs somewhat.

Figure 5:
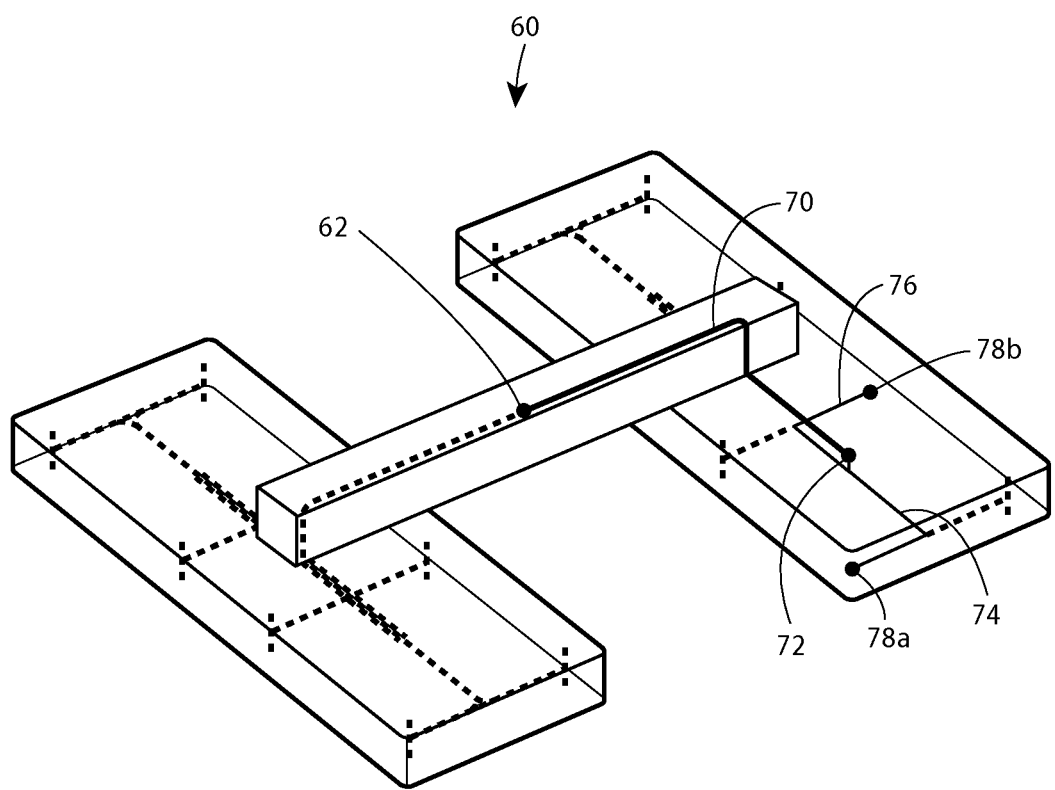
FIG. 5 is a perspective view of a feed system.

FIG. 5 illustrates an example of a naturally balanced feed manifold 60. The naturally balanced feed manifold 60 includes a first flow path 70 from the sprue 62 to a first junction 72 where the first flow path 70 splits into second and third flow paths 74, 76, the second flow path terminating at a second gate 78a and the third flow path 76 terminating at a third gate 78b each gate serving an individual mold cavity (not shown in FIG. 5). Molten thermoplastic material flowing from the sprue 62 to either the second gate 78a or the third gate 78b travels the same distance, experiences the same temperatures, and is subjected to the same cross-sectional flow areas. As a result, each mold cavity is filled simultaneously with molten thermoplastic material having identical physical properties.

Figure 6A:
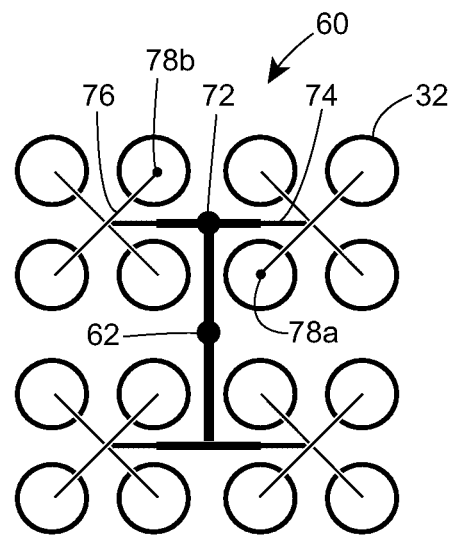
FIGS. 6A and 6B are top and front views of a naturally balanced feed system.
Figure 6B:
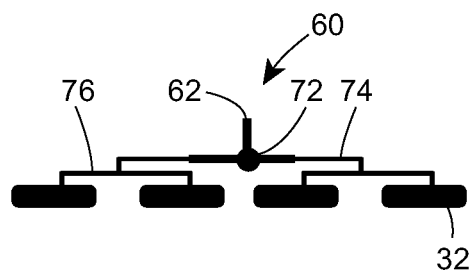

FIGS. 6A and 6B illustrate the naturally balanced manifold 60 schematically. The naturally balanced manifold 60 of FIGS. 6A and 6B is a multi-tier manifold. Each flow path 74, 76 has identical characteristics at identical locations along the flow path. For example, after the junction 72, each flow path narrows at the same distance. Moreover, each flow path serves an identical number of mold cavities 32. Naturally balanced flow manifolds 60 are critical to high pressure injection molding machines to maintain identical plastic flow properties and to ensure uniform parts.

Figure 7A:
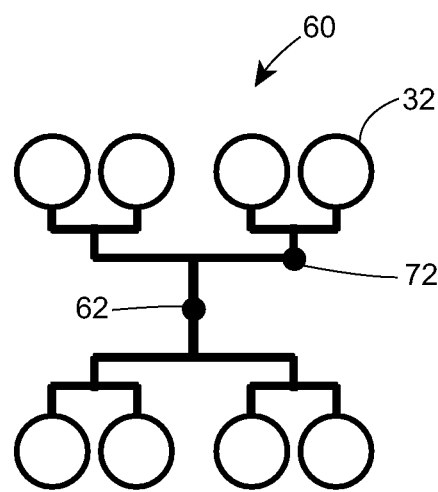
FIGS. 7A and 7B are top and front views of another naturally balanced feed system.
Figure 7B:
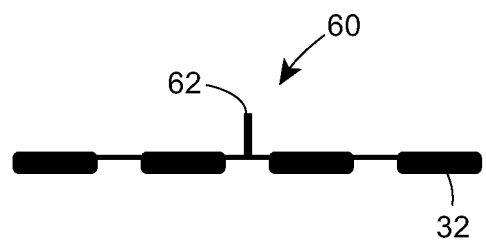

FIGS. 7A and 7B illustrate another naturally balanced manifold 60. The naturally balanced manifold 60 of FIGS. 7A and 7B is a single tier manifold.

Figure 8:
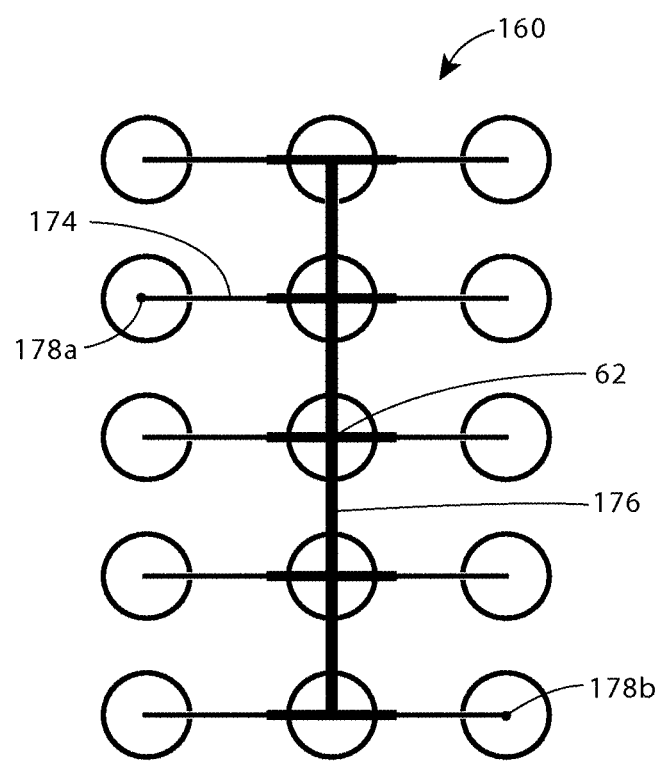
FIG. 8 is a top view of an artificially balanced feed system that may be used in the injection molding machine of FIG. 1.
Figure 9A:
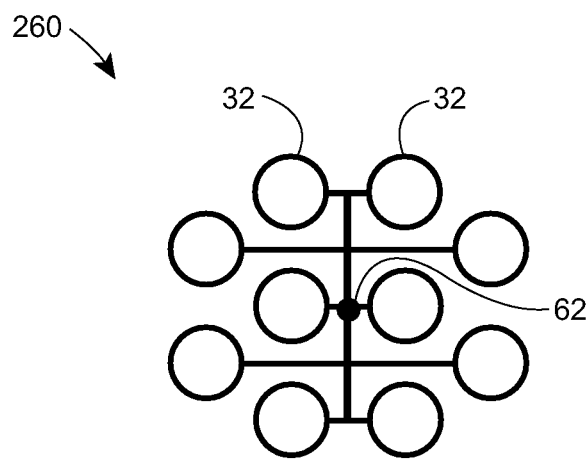
FIGS. 9A and 9B are top views of non-balanced feed systems that may be used in the injection molding machine of FIG. 1.
Figure 9B:
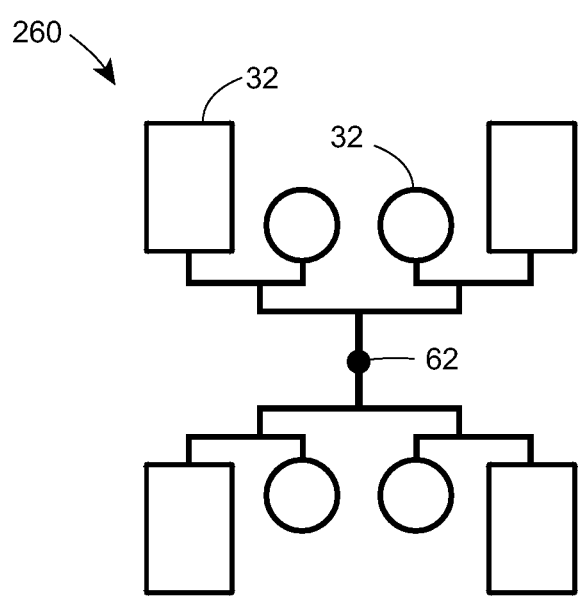

By contrast, FIGS. 8, 9A, and 9B illustrate non-naturally balanced manifolds with FIG. 8 illustrating an artificially balanced manifold and FIGS. 9A and 9B illustrating non-balanced manifolds.

The low constant pressure injection molding machine disclosed herein allows artificially balanced manifolds, and even unbalanced manifolds, to be used because thermoplastic materials injected at low constant pressure are not as sensitive to pressure differences or shear differences due to flow channel characteristic differences. In other words, the thermoplastic materials injected at low constant pressure retain nearly identical material and flow properties regardless of differences in flow channel length, cross-sectional area, or temperature. As a result, mold cavities may be filed sequentially instead of simultaneously.

The artificially balanced manifold 160 of FIG. 8 includes a sprue 62, a first flow channel 174, and a second flow channel 176. The first flow channel 174 terminates at a first gate 178a and the second flow channel 176 terminates at a second gate 178b. The first flow channel 174 is shorter than the second flow channel 178 in this embodiment. The artificially balanced manifold 160 varies some other parameter of the flow channel (e.g., cross-sectional area or temperature) so that the material flowing through the manifold 160 provides balanced flow to each cavity, similar to a naturally balanced manifold. In other words, thermoplastic material flowing through the first flow channel 174 will have about equal melt pressure to thermoplastic material flowing through the second flow channel 176. Because artificially balanced, or unbalanced, feed manifolds can include flow channels of different lengths, an artificially balanced, or unbalanced, feed manifold can make much more efficient use of space. Moreover, the feed channels and corresponding heater band channels can be machined more efficiently. Furthermore, naturally balanced feed manifolds are limited to molds having distinct, even numbers of mold cavities (e.g., 2, 4, 8, 16, 32, etc.). Artificially balanced, and unbalanced, feed manifolds may be designed to deliver molten thermoplastic material to any number of mold cavities.

The artificially balanced feed manifold 160 may also be constructed of a material having high thermal conductivity to enhance heat transfer to the molten thermoplastic material in hot runners, thus enhancing flow of the thermoplastic material. More specifically, the artificially balanced feed manifold 160 may be constructed of the same material as the mold to further reduce material costs and enhance heat transfer within the entire system.

FIGS. 9A and 9B illustrate non-balanced manifolds 260. The non-balanced manifolds 260 may include an odd number of mold cavities 232, and/or flow channels having different cross-sectional shapes, different number and type of turns, and/or the different temperatures. Moreover, the non-balanced manifolds 260 may feed mold cavities having different sizes, and or shapes, as illustrated in FIG. 9B.

In yet other embodiments, the artificially balanced manifolds and/or unbalanced manifolds may be used in molds having mold cavities in separate layers, such as a stack mold configuration, the manifolds feeding mold cavities in one, two, or more layers of the stack mold. Mold cavities may receive molten plastic from more than one gate or each individual gate could deliver more than one material sequentially to an individual mold cavity. Furthermore, more than one manifold may feed a cavity position that rotates within the mold from a first position, where a first material is introduced, to a second position, where a second material is introduced.

Figure 10:
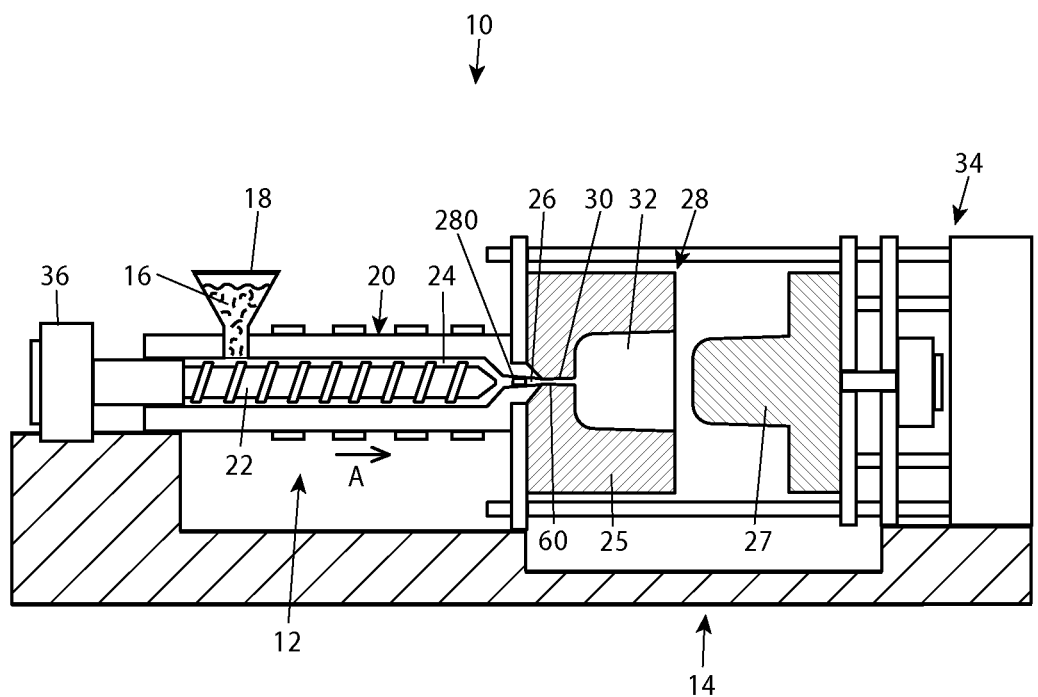
FIG. 10 is a schematic view of a first alternative embodiment of an injection molding machine constructed in accordance with the teachings of the disclosure, including a pressure regulating valve for controlling melt pressure.

As discussed above, the melt pressure of the polymer in the injection molding machine 10 may be controlled by a pressure regulating device as opposed to a closed loop control system. One such pressure regulating device, a pressure regulating valve 280 is illustrated in FIG. 10. The pressure regulating valve 280 may be disposed in either the nozzle 26 or the feed system or manifold 60 of the mold, or at any location between the nozzle 26 and the feed system or manifold 60, to maintain a substantially constant melt pressure of the polymer material downstream of the pressure regulating valve 280. The pressure regulating valve 280 eliminates the need for the controller 50 of the embodiment of FIG. 1.

Figure 11:
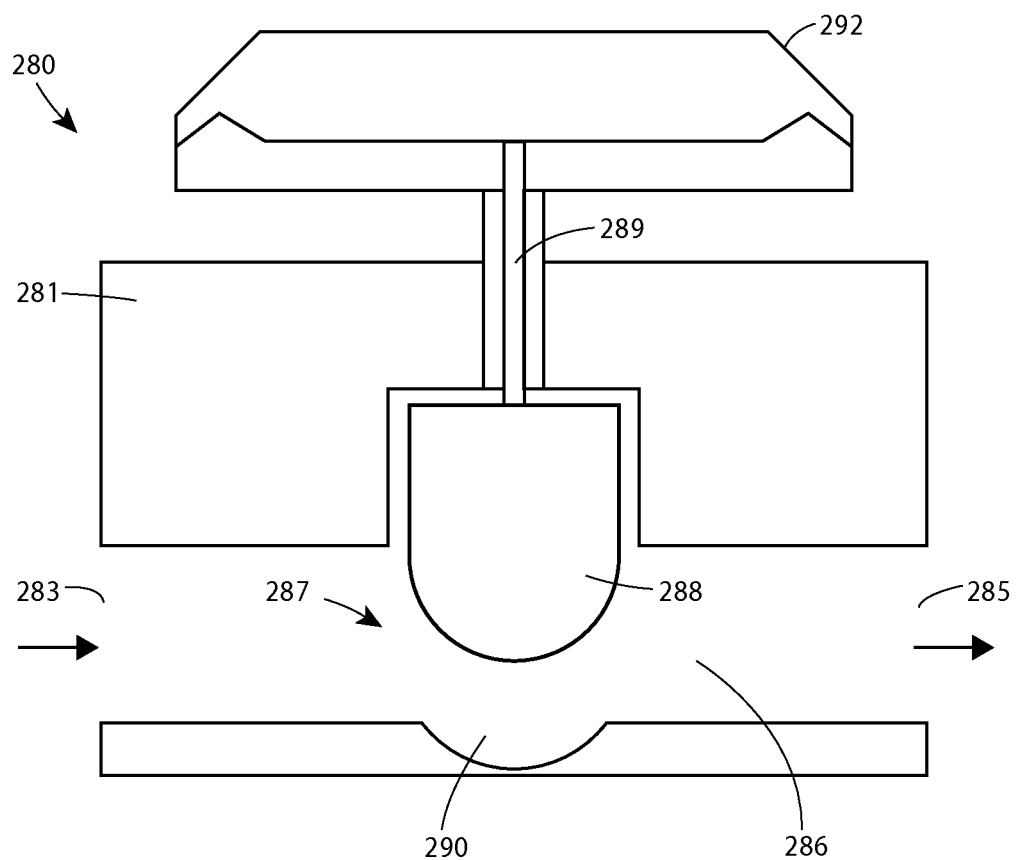
FIG. 11 is a cross-sectional view of the pressure regulating valve of FIG. 10.

In one embodiment of a pressure regulating valve 280, as illustrated in FIG. 11, the pressure regulating valve includes a valve body 281 having a molten plastic inlet 283 and a molten plastic outlet 285 connected by a molten plastic passageway 286 having an orifice 287. A valve plug 288 is disposed in the orifice 287 and connected to a valve stem 289. A valve seat 290 is also disposed in the orifice, the valve plug 288 and valve seat 290 cooperating to regulate flow of the molten plastic through the orifice 287. An actuator 292 is connected to the valve stem 289 and the actuator 292 moves the valve stem 289 and the valve plug 288 towards or away from the valve seat 290 to control the flow of molten plastic through the orifice 287. The actuator may be a self regulating valve that uses downstream melt pressure to regulate flow of molten plastic. The actuator controls a position of the valve plug 288 to maintain a substantially constant melt pressure downstream of the pressure regulating valve 280.

The molten plastic passageway 286 is substantially straight between the molten plastic inlet 283 and the molten plastic outlet 285. By having a substantially straight molten plastic passageway 286, the pressure regulating valve 280 minimizes shear of the molten plastic as the molten plastic moves through the molten plastic passageway 286. Minimizing redirections of flow results in lower pressure loss in the feed system.

While the pressure regulating valve 280 is shown in the nozzle 26, the pressure regulating valve 280 may also be located adjacent to a mold gate in the feed system or manifold 60. Molten plastic from the pressure regulating valve 280 may be diverted to a plurality of mold gates 30 so that one pressure regulating valve 280 feeds a plurality of mold cavities 32. Such a pressure regulating valve 280 may be located in a hot runner of the manifold. In one embodiment, the pressure regulating valve maintains a substantially constant downstream melt pressure of less than 6000 psi.

Figure 12:
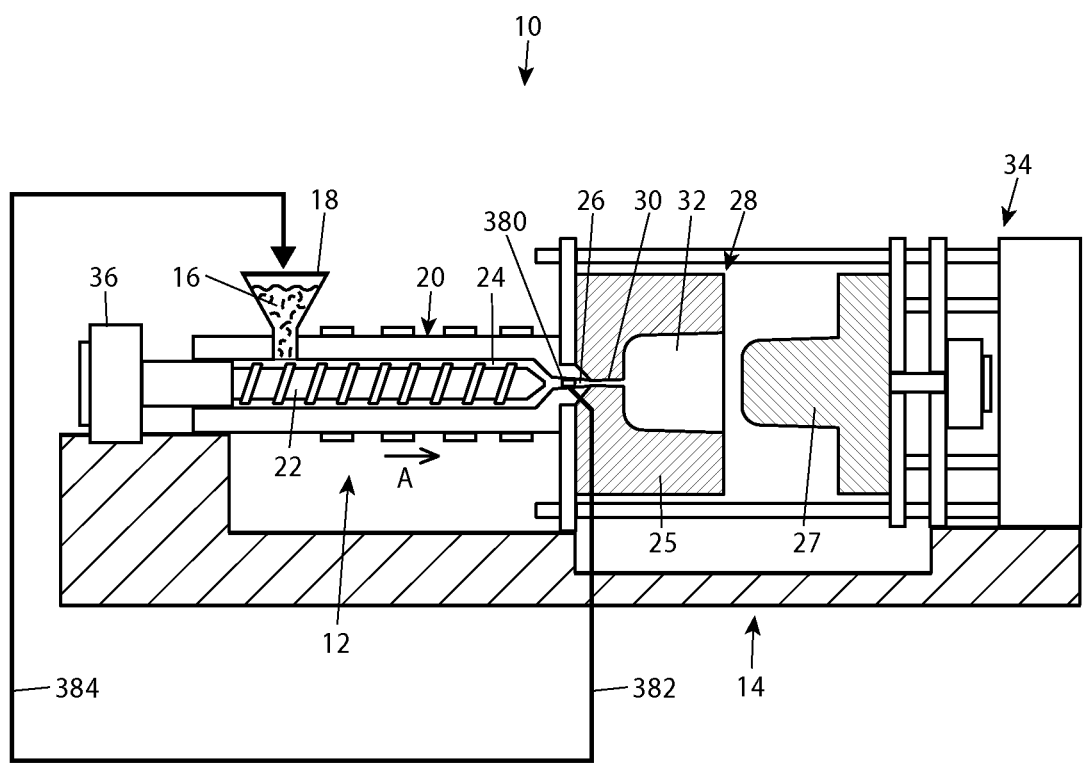
FIG. 12 is a schematic view of a second alternative embodiment of an injection molding machine constructed in accordance with the teachings of the disclosure, including a pressure relief valve for controlling melt pressure.

Turning now to FIG. 12, a pressure relief valve 380 may be used to maintain a substantially constant melt pressure. In this case, a set point of the pressure relief valve 380 is lower than the melt pressure on a melt holder side of the pressure relief valve 380. As a result, a portion of the molten plastic is vented out of the pressure relief valve 380 through a pressure relief outlet 382. Generally, the melt pressure upstream of the pressure relief valve should be kept at least 20 psi above the set point of the pressure relief valve 380 to ensure that the melt pressure does not drop below the set point of the pressure relief valve. Preferably, the melt pressure upstream of the pressure relief valve should be maintained at least 100 psi above the set point of the pressure relief valve 380 and more preferably more than 150 psi above the set point of the pressure relief valve 380.

Molten plastic diverted out of the pressure relief valve 380 through the pressure relief outlet 382 may be diverted back to the hopper 18 for reuse through a return circuit 384. The return circuit 384 may keep the molten plastic in a molten state during transfer. Alternatively, the molten plastic may be allowed to cool and solidify and the return circuit 384 may be a conveyor belt, or other transport structure that returns the solidified plastic to the hopper 18.

In yet other embodiments, the injection molding machine may include a pressure regulating valve and a pressure relief valve oriented in series. More specifically, the pressure regulating valve may be upstream of the pressure relief valve so that the pressure relief valve acts as a safety mechanism in the event of pressure regulating valve failure.

Drilling and Milling Machineability Index Test Methods

The drilling and milling machineability indices listed above in Table 1 were determined by testing the representative materials in carefully controlled test methods, which are described below.

The machineability index for each material was determined by measuring the spindle load needed to drill or mill a piece of the material with all other machine conditions (e.g., stock feed rate, spindle rpm, etc.) being held constant between the various materials. Spindle load is reported as a ratio of the measured spindle load to the maximum spindle torque load of 75 ft-lb at 1400 rpm for the drilling or milling device. The index percentage was calculated as a ratio between the spindle load for 1117 steel to the spindle load for the test material.

The test milling or drilling machine was a Hass VF-3 Machining Center.

Drilling Conditions

TABLE 2

| Spot Drill | 120 degree 0.5" diameter, drilled to 0.0693" depth |
| --- | --- |
| Drill Bit | ¹⁵⁄₃₂" diameter high speed steel uncoated jobber length bit |
| Spindle Speed | 1200 rpm |
| Depth of Drill | 0.5" |
| Drill Rate | 3 in/min |
| Other | No chip break routine used |

Milling Conditions

TABLE 3

| Mill | 0.5" diameter 4 flute carbide flat bottom end mill, uncoated (SGS part # 36432 www.sgstool.com |
| --- | --- |
| Spindle Speed | 1200 rpm |
| Depth of Cut | 0.5" |
| Stock Feed Rate | 20 in/min |

For all tests "flood blast" cooling was used. The coolant was Koolrite 2290.

EDM Machineability Index Test Methods

The graphite and copper sinker EDM machineability indices listed above in Table 1 were determined by testing the representative materials in a carefully controlled test method, which is described below.

The EDM machineability index for the various materials were determined by measuring the time to burn an area (specifics below) into the various test metals. The machineability index percentage was calculated as the ratio of the time to burn into 1117 steel to time required to burn the same area into the other test materials.

Wire EDM

TABLE 4

| Equipment | Fanuc OB |
| --- | --- |
| Wire | 0.25 mm diameter hard brass |
| Cut | 1" thick × 1" length (1 sq. ") |
| Parameters | Used Fanuc on board artificial intelligence, override @ 100% |

Sinker EDM—Graphite

TABLE 5

| Equipment | Ingersoll Gantry 800 with Mitsubishi EX Controller |
| --- | --- |
| Wire | System 3R pre-mounted 25 mm diameter Poco EDM 3 graphite |
| Cut | 0.1" Z axis plunge |
| Parameters | Used Mitsubishi CNC controls with FAP EX Series Technology |

Sinker EDM—Copper

TABLE 6

| Equipment | Ingersoll Gantry 800 with Mitsubishi EX Controller |
| --- | --- |
| Wire | System 3R pre-mounted 25 mm diameter Tellurium Copper |
| Cut | 0.1" Z axis plunge |
| Parameters | Used Mitsubishi CNC controls with FAP EX Series Technology |

The disclosed low constant pressure injection molding machines advantageously employ molds constructed from easily machineable materials. As a result, the disclosed low constant pressure injection molding machines are less expensive and faster to produce. Additionally, the disclosed low constant pressure injection molding machines are capable of employing more flexible support structures and more adaptable delivery structures, such as wider platen widths, increased tie bar spacing, elimination of tie bars, lighter weight construction to facilitate faster movements, and non-naturally balanced feed systems. Thus, the disclosed low constant pressure injection molding machines may be modified to fit delivery needs and are more easily customizable for particular molded parts.

It is noted that the terms "substantially," "about," and "approximately," unless otherwise specified, may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue. Unless otherwise defined herein, the terms "substantially," "about," and "approximately" mean the quantitative comparison, value, measurement, or other representation may fall within 20% of the stated reference.

It should now be apparent that the various embodiments of the products illustrated and described herein may be produced by a low constant pressure injection molding process. While particular reference has been made herein to products for containing consumer goods or consumer goods products themselves, it should be apparent that the low constant pressure injection molding method discussed herein may be suitable for use in conjunction with products for use in the consumer goods industry, the food service industry, the transportation industry, the medical industry, the toy industry, and the like.

All documents cited in the Detailed Description of the Invention are, in relevant part, incorporated herein by reference; the citation of any document is not to be construed as an admission that it is prior art with respect to the present invention. To the extent that any meaning or definition of a term in this written document conflicts with any meaning or definition of the term in a document incorporated by reference, the meaning or definition assigned to the term in this written document shall govern.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A melt pressure regulating mechanism for an injection molding apparatus having a melt holder for pressurizing molten plastic prior to injection into a mold, and an injection element for advancing the molten plastic from the melt holder through a nozzle and into the mold, the melt pressure regulating mechanism comprising:
   a fluid pressure regulating valve having a valve body with a molten plastic inlet and a molten plastic outlet connected by a molten plastic passageway, wherein the fluid pressure regulating valve is configured to control an amount of molten plastic moving through the molten plastic passageway such that the molten plastic that is downstream from the fluid pressure regulating valve is maintained at a substantially constant pressure; and
   a pressure relief valve oriented in series with the fluid pressure regulating valve.

2. The melt pressure regulating mechanism of claim 1, wherein the fluid pressure regulating valve is disposed upstream of the pressure relief valve.

3. The melt pressure regulating mechanism of claim 1, wherein the fluid pressure regulating valve is disposed between the nozzle and a feed system of the injection molding apparatus.

4. The melt pressure regulating mechanism of claim 1, wherein the fluid pressure regulating valve is disposed in the nozzle.

5. The melt pressure regulating mechanism of claim 1, wherein the fluid pressure regulating valve is disposed in a feed system of the injection molding apparatus.

6. The melt pressure regulating mechanism of claim 1, wherein the fluid pressure regulating valve is disposed between the nozzle and a manifold of the injection molding apparatus.

7. The melt pressure regulating mechanism of claim 1, wherein the fluid pressure regulating valve is disposed in a manifold of the injection molding apparatus.

8. The melt pressure regulating mechanism of claim 1, wherein the fluid pressure regulating valve is disposed adjacent to a mold gate of the injection molding apparatus.

9. An injection molding machine including the melt pressure regulating mechanism and the injection molding apparatus of claim 1

* * * * *